United States Patent
Nakagawa et al.

(10) Patent No.: US 10,011,728 B2
(45) Date of Patent: Jul. 3, 2018

(54) INK, INK CARTRIDGE, INKJET RECORDING APPARATUS, INKJET RECORDING METHOD, AND RECORDED MATTER

(71) Applicants: Tomohiro Nakagawa, Kanagawa (JP); Hikaru Kobayashi, Kanagawa (JP); Noriaki Okada, Kanagawa (JP)

(72) Inventors: Tomohiro Nakagawa, Kanagawa (JP); Hikaru Kobayashi, Kanagawa (JP); Noriaki Okada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/212,586

(22) Filed: Jul. 18, 2016

(65) Prior Publication Data

US 2017/0022380 A1    Jan. 26, 2017

(30) Foreign Application Priority Data

Jul. 22, 2015 (JP) ................................ 2015-145129

(51) Int. Cl.
| | |
|---|---|
| *C09D 11/322* | (2014.01) |
| *C09D 11/02* | (2014.01) |
| *C09D 11/033* | (2014.01) |
| *B41J 2/21* | (2006.01) |
| *C08G 18/66* | (2006.01) |

(Continued)

(52) U.S. Cl.
CPC ............ *C09D 11/02* (2013.01); *B41J 2/2114* (2013.01); *C08G 18/0823* (2013.01); *C08G 18/348* (2013.01); *C08G 18/42* (2013.01); *C08G 18/44* (2013.01); *C08G 18/48* (2013.01); *C08G 18/6659* (2013.01); *C08G 18/6692* (2013.01); *C08G 18/73* (2013.01); *C08G 18/758* (2013.01); *C09D 11/033* (2013.01); *C09D 11/102* (2013.01); *C09D 11/107* (2013.01); *C09D 11/322* (2013.01)

(58) Field of Classification Search
CPC ...... C09D 11/02; C09D 11/033; C09D 11/322; C09D 11/102; C09D 11/107; B41J 2/2114; C08G 18/73; C08G 18/6659; C08G 18/348; C08G 18/44; C08G 18/758; C08G 18/48; C08G 18/6692; C08G 18/42; C08G 18/0823
See application file for complete search history.

(56) References Cited

U.S. PATENT DOCUMENTS

| | | |
|---|---|---|
| 8,651,650 B2 | 2/2014 | Matsuyama et al. |
| 9,108,439 B2 | 8/2015 | Toda et al. |

(Continued)

FOREIGN PATENT DOCUMENTS

| | | |
|---|---|---|
| JP | 2005-220352 | 8/2005 |
| JP | 2011-094082 | 5/2011 |
| JP | 2016-108441 | 6/2016 |

OTHER PUBLICATIONS

U.S. Appl. No. 15/062,300, filed Mar. 7, 2016.
U.S. Appl. No. 15/070,193, filed Mar. 7, 2016.

*Primary Examiner* — Yaovi M Ameh
(74) *Attorney, Agent, or Firm* — Cooper & Dunham LLP

(57) ABSTRACT

Provided is an ink containing water, a color material, an acrylic resin, urethane resin particles, and at least one organic solvent, wherein the at least one organic solvent includes 3-methyl-3-methoxy-1-butanol.

18 Claims, 2 Drawing Sheets

(51) Int. Cl.
*C08G 18/73* (2006.01)
*C08G 18/75* (2006.01)
*C09D 11/102* (2014.01)
*C09D 11/107* (2014.01)
*C08G 18/08* (2006.01)
*C08G 18/34* (2006.01)
*C08G 18/42* (2006.01)
*C08G 18/44* (2006.01)
*C08G 18/48* (2006.01)

(56) References Cited

U.S. PATENT DOCUMENTS

| | | |
|---|---|---|
| 9,163,160 B2 | 10/2015 | Toda et al. |
| 9,243,158 B2 | 1/2016 | Toda et al. |
| 2005/0176847 A1 | 8/2005 | Cagle et al. |
| 2007/0037923 A1* | 2/2007 | Shiba ............ B32B 27/08 524/556 |
| 2011/0242192 A1* | 10/2011 | Sasada ............ B41M 5/506 347/20 |
| 2011/0318551 A1 | 12/2011 | Nakagawa |
| 2012/0188312 A1 | 7/2012 | Nakagawa |
| 2012/0308785 A1 | 12/2012 | Nakagawa |
| 2013/0063524 A1 | 3/2013 | Katoh et al. |
| 2013/0197144 A1 | 8/2013 | Katoh et al. |
| 2013/0271524 A1 | 10/2013 | Katoh et al. |
| 2014/0132661 A1* | 5/2014 | Inumaru ............ B41M 5/0023 347/21 |
| 2015/0017396 A1 | 1/2015 | Nakagawa et al. |
| 2015/0050467 A1 | 2/2015 | Nakagawa et al. |
| 2015/0077479 A1 | 3/2015 | Nakagawa et al. |
| 2015/0116433 A1 | 4/2015 | Fujii et al. |
| 2015/0138284 A1 | 5/2015 | Nagashima et al. |
| 2015/0165787 A1* | 6/2015 | Fujii ............ B41J 11/002 347/102 |
| 2015/0191614 A1 | 7/2015 | Nagashima et al. |
| 2015/0258783 A1 | 9/2015 | Toda et al. |
| 2015/0259553 A1 | 9/2015 | Nakagawa et al. |
| 2015/0329731 A1* | 11/2015 | Fujii ............ C09D 11/102 347/20 |
| 2015/0361282 A1 | 12/2015 | Nakagawa et al. |
| 2015/0368492 A1 | 12/2015 | Fujii et al. |
| 2016/0032122 A1 | 2/2016 | Toda et al. |
| 2016/0068697 A1 | 3/2016 | Toda et al. |
| 2016/0102220 A1 | 4/2016 | Kido et al. |

* cited by examiner

INK, INK CARTRIDGE, INKJET RECORDING APPARATUS, INKJET RECORDING METHOD, AND RECORDED MATTER

CROSS-REFERENCE TO RELATED APPLICATIONS

The present application claims priority under 35 U.S.C. § 119 to Japanese Patent Application No. 2015-145129, filed Jul. 22, 2015. The contents of which are incorporated herein by reference in their entirety.

BACKGROUND OF THE INVENTION

Field of the Invention

The present disclosure relates to inks, ink cartridges, inkjet recording apparatuses, inkjet recording methods, and recorded matters.

Description of the Related Art

Impermeable base materials such as plastic films are used for industrial purposes such as displays, posters, and bulletin boards from a viewpoint of durabilities such as light resistance, water resistance, and wear resistance. There have been developed inks to be used on the impermeable base materials.

Widely used among such inks are solvent-based inks using an organic solvent as a medium. However, there is a problem that the solvent-based inks are feared to become hazardous to the environment through solvent vaporization.

Hence, there have been proposed water-based inks that are lowly environmentally hazardous and can be recorded directly over impermeable base materials (see, e.g., Japanese Unexamined Patent Application Publication No. 2005-220352 and Japanese Unexamined Patent Application Publication No. 2011-094082).

SUMMARY OF THE INVENTION

An ink of the present disclosure contains water, a color material, an acrylic resin, urethane resin particles, and at least one organic solvent. The at least one organic solvent includes 3-methyl-3-methoxy-1-butanol.

DESCRIPTION OF THE EMBODIMENTS (Ink)

Figure 1:
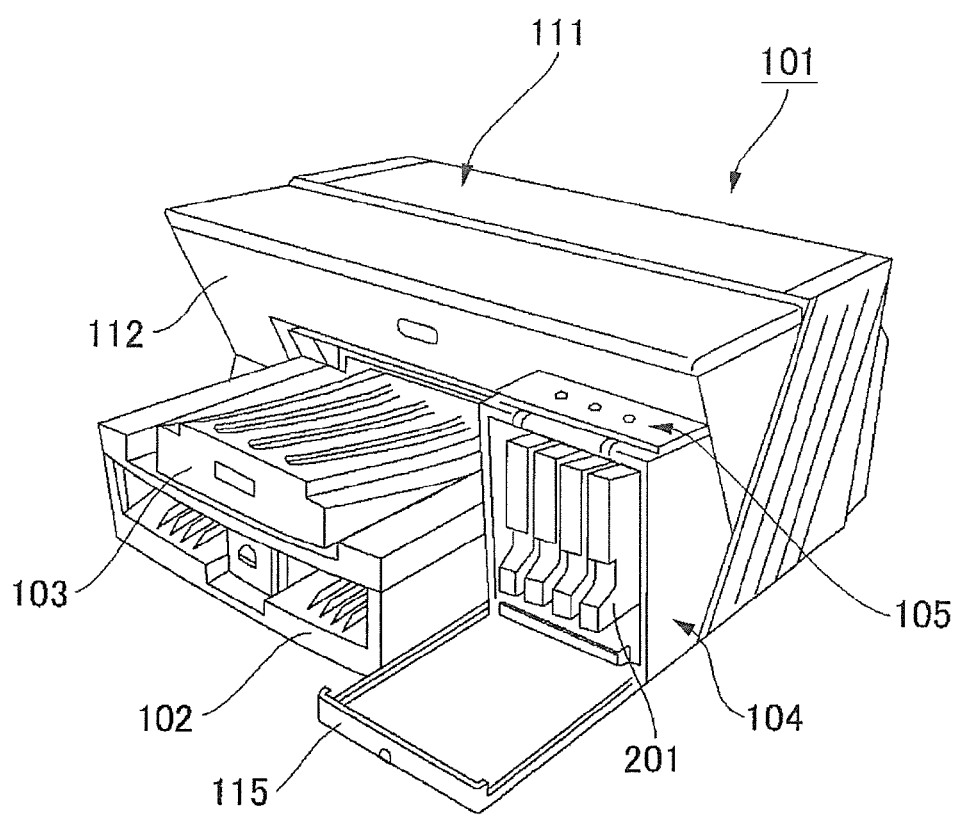
FIG. 1 is a schematic view illustrating an example of a serial-type inkjet recording apparatus.

An ink of the present disclosure contains water, a color material, an acrylic resin, urethane resin particles, and at least one organic solvent, and further contains other components as needed.

The ink of the present disclosure is based on a finding from the following problem of existing water-based inks. Specifically, due to a high tendency for liquid components to volatilize from the existing water based inks because of the main component of the inks being water, it is likely that dispersion stability of a pigment in the inks, and scratch resistance and glossiness of an image are degraded, and that discharging failures of the inks occur in the case of intermittent discharging.

The present inventors have found that an ink is capable of providing an image with an excellent scratch resistance when the ink contains urethane resin particles. This is considered to be because a high cohesive force of urethane resin particles causes an intermolecular force in a soft segment portion to increase hardness of a resin coating film and improve scratch resistance.

The present inventors have also found that a dispersion method in a color material dispersion largely influences intermittent discharging stability. Specifically, it has been found that use of a so-called resin-coated pigment obtained by encapsulating a color material such as a pigment in water-insoluble resin particles leads to filming in nozzles and inhibition of discharging because the water-insoluble resin particles coating the pigment promote filming of urethane resin particles contained in the ink. Furthermore, it has been found that use of a color material dispersed with a surfactant having a low molecular weight makes the ink unable to be discharged when the ink dries during storage because drying of the ink causes the surfactant to be desorbed from a surface of the color material and increases the viscosity of the ink. Meanwhile, it has been found that use of a color material dispersed with a dispersant polymer can provide a high intermittent discharging stability.

However, there is a tendency that an image over a recorded matter over which the image is recorded with an ink containing a color material dispersed with the dispersant polymer and urethane resin particles has a considerably low glossiness.

This is considered to be because the urethane resin particles and an acrylic resin used as the dispersant polymer have a low compatibility and the resins cause phase separation from each other in a coating film.

The present inventors have found that addition of 3-methyl-3-methoxy-1-butanol as an organic solvent to an ink containing a color material dispersed with the dispersant polymer and urethane resin particles can improve compatibility between the resins and improve intermittent discharging stability, scratch resistance, and glossiness.

The present disclosure has an object to provide an ink excellent in intermittent discharging stability and capable of providing an image having a favorable scratch resistance and a favorable glossiness.

The present disclosure can provide an ink excellent in intermittent discharging stability and capable of providing an image having a favorable scratch resistance and a favorable glossiness.

<Color Material>

The color material is not particularly limited and may be appropriately selected depending on the intended purpose. Examples of the color material include pigments, hollow resin particles, and dyes. One of these color materials may be used alone or two or more of these color materials may be used in combination. Among these color materials, pigments are preferable.

Examples of the pigments include inorganic pigments and organic pigments. One of these pigments may be used alone or two or more of these pigments may be used in combination.

Examples of the inorganic pigments include titanium oxide, iron oxide, calcium carbonate, barium sulfate, aluminium hydroxide, barium yellow, cadmium red, chrome yellow, and carbon black produced by a known method such as a contact method, a furnace method, and a thermal method. One of these inorganic pigments may be used alone or two or more of these inorganic pigments may be used in combination.

Examples of the organic pigments include azo-pigments (e.g., azo-lake, insoluble azo-pigments, condensed azo-pigments, and chelate azo-pigments), polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye chelates and acidic dye chelates), nitro pigments, nitroso pigments, and aniline black. One of these organic pigments may be used alone or two or more of these organic pigments may be used in combination.

Specific examples of pigments for black include carbon blacks (C. I. Pigment Black 7) such as furnace black, lamp black, acetylene black, and channel black; metals such as copper, iron (C. I. Pigment Black 11), and titanium oxide; and organic pigments such as aniline black (C. I. Pigment Black 1). One of these pigments for black may be used alone or two or more of these pigments for black may be used in combination.

Examples of pigments for colors include: C. I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, and 155; C. I. Pigment Orange 5, 13, 16, 17, 36, 43, and 51; C. I. Pigment Red 1, 2, 3, 5, 17, 22, 23, 31, 38, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (colcothar), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C. I. Pigment Violet 1 (Rhodamine Lake), 3, 51, 16, 19, 23, and 38; C. I. Pigment Blue 1, 2, 15 (Phthalocyanine blue), 15:1, 15:2, 15:3 (Phthalocyanine blue), 15:4, 16, 171, 56, 60, and 63; and C. I. Pigment Green 1, 4, 7, 8, 10, 17, 18, and 36. One of these pigments for colors may be used alone or two or more of these pigments for colors may be used in combination.

The hollow resin particles can be used as a colorant for a white ink.

The hollow resin particles are not particularly limited and may be appropriately selected depending on the intended purpose. Examples of the hollow resin particles include styrene-acrylic resins and crosslinked styrene-acrylic resins. One kind of these hollow resin particles may be used alone or two or more kinds of these hollow resins particles may be used in combination.

The hollow resin particles may be a commercially available product. Examples of the commercially available product for styrene acrylic resins include: product name: MH5055 (available from Zeon Corporation); and product name: ROPAQUE OP-62, product name: ROPAQUE OP-84J, product name: ROPAQUE OP-91, product name: ROPAQUE HP-1055, product name: ROPAQUE HP-91, and product name: ROPAQUE ULTRA (all available from Rohm and Haas Company). Examples of the commercially available product for crosslinked styrene acrylic resins include: product name: SX-863 (A), product name: SX-864 (B), product name: SX-866 (A), product name: SX-866 (B), and product name: SX-868 (all available from JSR Corporation); and product name: ROPAQUE ULTRA E and product name: ROPAQUE ULTRA DUAL (both available from Rohm and Haas Company). One of these commercially available products may be used alone or two or more of these commercially available products may be used in combination.

The dyes are not particularly limited and may be appropriately selected depending on the intended purpose. Examples of the dyes include acid dyes, food dyes, direct dyes, basic dyes, and reactive dyes. One of these dyes may be used alone or two or more of these dyes may be used in combination.

Examples of the acid dyes and food dyes include: C.I. Acid Yellow 17, 23, 42, 44, 79, and 142; C.I. Acid Red 1, 8, 13, 14, 18, 26, 27, 35, 37, 42, 52, 82, 87, 89, 92, 97, 106, 111, 114, 115, 134, 186, 249, 254, and 289; C.I. Acid Blue 9, 29, 45, 92, and 249; C.I. Acid Black 1, 2, 7, 24, 26, and 94; C.I. Food Yellow 3 and 4; C.I. Food Red 7, 9, and 14; and C.I. Food Black 1 and 2. One of these acid dyes and food dyes may be used alone or two or more of these acid dyes and food dyes may be used in combination.

Examples of the direct dyes include: C.I. Direct Yellow 1, 12, 24, 26, 33, 44, 50, 86, 120, 132, 142, and 144; C.I. Direct Red 1, 4, 9, 13, 17, 20, 28, 31, 39, 80, 81, 83, 89, 225, and 227; C.I. Direct Orange 26, 29, 62, and 102; C.I. Direct Blue 1, 2, 6, 15, 22, 25, 71, 76, 79, 86, 87, 90, 98, 163, 165, 199, and 202; and C.I. Direct Black 19, 22, 32, 38, 51, 56, 71, 74, 75, 77, 154, 168, and 171. One of these direct dyes may be used alone or two or more of these direct dyes may be used in combination.

Examples of the basic dyes include: C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112; C.I. Pigment Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155; and C.I. Basic Black 2 and 8. One of these basic dyes may be used alone or two or more of these basic dyes may be used in combination.

Examples of the reactive dyes include: C.I. Reactive Black 3, 4, 7, 11, 12, and 17; C.I. Reactive Yellow 1, 5, 11, 13, 14, 20, 21, 22, 25, 40, 47, 51, 55, 65, and 67; C.I. Reactive Red 1, 14, 17, 25, 26, 32, 37, 44, 46, 55, 60, 66, 74, 79, 96, and 97; and C.I. Reactive Blue 1, 2, 7, 14, 15, 23, 32, 35, 38, 41, 63, 80, and 95. One of these reactive dyes may be used alone or two or more of these reactive dyes may be used in combination.

A content of the color material is preferably 0.1% by mass or greater but 10% by mass or less and more preferably 1% by mass or greater but 10% by mass or less of a total amount of the ink. When the content of the color material is 0.1% by mass or greater, image density can be increased and image qualities can be improved. When the content of the color material is 10% by mass or less, scratch resistance and intermittent discharging stability can be improved and clogging can be suppressed.

<Acrylic Resin>

The acrylic resin is a polymer containing as a monomer, at least one of (meth)acrylic acid and salts of the (meth) acrylic acid and further containing any other monomer as needed. The (meth)acrylic acid refers to at least one of acrylic acid and methacrylic acid.

The acrylic resin is not particularly limited and may be appropriately selected depending on the intended purpose so long as the acrylic resin is capable of dispersing the color material.

It is preferable to use the acrylic resin in a form of a dispersant polymer containing the acrylic resin. It is preferable that the color material be dispersed in the ink by the dispersant polymer. The dispersant polymer refers to a material having a weight average molecular weight of 3,000 or greater but 50,000 or less and having a structure containing a monomer A made of at least one of (meth)acrylic acid and salts of (meth)acrylic acid and as needed, a monomer B such as an acrylic acid ester and any other monomer C such as a vinyl group-containing compound.

Examples of the monomer A include acrylic acid, methacrylic acid, and lithium salts, sodium salts, potassium salts, and ammonium salts of the acrylic acid and methacrylic acid. One of these monomers may be used alone or two or more of these monomers may be used in combination. Among these monomers, sodium acrylate is preferable.

Examples of the monomer B include: alkyl (meth)acrylates such as methyl (meth)acrylate, ethyl (meth)acrylate, butyl (meth)acrylate, ethylhexyl (meth)acrylate, and cyclohexyl (meth)acrylate; hydroxyalkyl (meth)acrylates such as hydroxyethyl (meth)acrylate, hydroxypropyl (meth)acrylate, and hydroxybutyl (meth)acrylate; hydroxyl group-containing (meth)acrylates; and (meth)acrylamides such as (meth)acrylamide and N-methylol (meth)acrylamide. One of these monomers may be used alone or two or more of these monomers may be used in combination.

The monomer C is not particularly limited and may be appropriately selected depending on the intended purpose so long as the monomer C is a compound containing an unsaturated binding site copolymerizable with the monomer A and the monomer B. Examples of the monomer C include: unsaturated acids such as crotonic acid, itaconic acid, maleic acid, fumaric acid, mesaconic acid, citraconic acid, aconitic acid, and glutaconic acid, salts of these unsaturated acids, and ester compounds thereof; unsaturated acid anhydrides such as maleic anhydride, itaconic anhydride, and citraconic anhydride; and vinyl aromatic compounds such as styrene, α-methylstyrene, and vinyltoluene. One of these monomers may be used alone or two or more of these monomers may be used in combination.

A weight average molecular weight of the dispersant polymer is preferably 3,000 or greater but 50,000 or less and more preferably 3,000 or greater but 30,000 or less. The weight average molecular weight of the dispersant polymer can be measured by polystyrene conversion through gel permeation chromatography (GPC).

The dispersant polymer may be an appropriately synthesized product or a commercially available product.

The synthesized product can be obtained by allowing the monomer A, and as needed, the monomer B and the monomer C to undergo radical polymerization in an aqueous medium.

A polymerization initiator used for the radical polymerization is not particularly limited and may be appropriately selected depending on the intended purposed so long as the polymerization initiator is a substance that decomposes under polymerization conditions and produces free radicals. Examples of the polymerization initiator include peroxides and azo-compounds. One of these polymerization initiators may be used alone or two or more of these polymerization initiators may be used in combination.

Examples of the peroxides include: inorganic peroxides such as sodium persulfate and hydrogen peroxides; and organic peroxides such as hydroperoxides, dialkyl peroxides, diacyl peroxides, and peroxide esters. One of these peroxides may be used alone or two or more of these peroxides may be used in combination.

Examples of the azo-compounds include 2,2'-azobisisobutyronitrile, 2,2'-azobis(2,4-dimethylvaleronitrile), and 2,2'-azobis(2-methylbutyronitrile). One of these azo-compounds may be used alone or two or more of these azo-compounds may be used in combination.

A content of the polymerization initiator varies depending on, for example, the kind of the polymerization initiator and polymerization conditions. However, the content is preferably 1 part by mass or greater but 5 parts by mass or less relative to 100 parts by mass of the monomer mixture.

In a step of making the monomers undergo polymerization (hereinafter may be referred to as a "polymerizing step"), it is preferable to use a chain-transfer agent in terms of adjusting the weight average molecular weight.

The chain-transfer agent is not particularly limited and may be appropriately selected depending on the intended purpose. Examples of the chain-transfer agent include lower alcohols, thiols, hypophosphites, and bisulfites. One of these chain-transfer agents may be used alone or two or more of these chain-transfer agents may be used in combination.

Examples of the lower alcohols include isopropyl alcohol.

Examples of the thiols include mercaptoethanol.

Examples of the hypophosphites include sodium hypophosphite and potassium hypophosphite.

Examples of the bisulfites include sodium bisulfite.

A content of the chain-transfer agent varies depending on, for example, the kind of the chain-transfer agent and polymerization conditions. However, the content is preferably 5 parts by mass or greater but 120 parts by mass or less relative to 100 parts by mass of the monomer mixture.

A temperature, a polymerization method, and other conditions for the polymerization of the monomer mixture are not particularly limited and may be appropriately selected depending on the intended purpose.

The temperature is not particularly limited and may be appropriately selected depending on the intended purpose, and is preferably 70° C. or higher but 100° C. or lower. When the temperature is 70° C. or higher but 100° C. or lower, a time required for polymerization can be shortened and an amount of residual monomers can be reduced, and as a result, loads on a reactor can be suppressed.

Examples of a specific method for the polymerizing step include (i) a method of adding the monomer mixture and the polymerization initiator to an aqueous medium that is heated to a temperature within the temperature range mentioned above and is being stirred, (ii) a method of adding the polymerization initiator to the monomer mixture and an aqueous medium that are heated to a temperature within the temperature range mentioned above and are being stirred, and (iii) a method of adding, to an aqueous medium that is heated to a temperature within the temperature range mentioned above, contains part of the monomers (the part being a single monomer or a mixture), and is being stirred, the remaining part of the monomers and the polymerization initiator.

It is preferable to provide a neutralizing step after the polymerizing step as needed.

In the neutralizing step, acid groups (—COOH and —SO$_3$H) of the copolymer obtained in the polymerizing step can be neutralized partially (25% or more but 99% or less) or neutralized completely (100%).

A neutralizing agent used in the neutralizing step is not particularly limited and may be appropriately selected depending on the intended purpose. Examples of the neutralizing agent include sodium hydroxide (aqueous solution), ammonia (aqueous solution), and potassium hydroxide (aqueous solution). One of these neutralizing agents may be used alone or two or more of these neutralizing agents may be used in combination.

pH of a reaction system in the neutralizing step is not particularly limited and may be appropriately selected depending on the intended purpose, and is preferably 2.0 or higher but 11.0 or lower and more preferably 6.0 or higher but 9.0 or lower.

When the aqueous medium used in the polymerizing step contains water and an organic solvent, it is preferable to provide a step of evaporating the organic solvent before the neutralizing step.

Examples of commercially available products of the acrylic resin include: product name: ARON T-50, product name: A-210, and product name: A-6330 (all available from Toagosei Co., Ltd.); and product name: AQUARIC DL, product name: AQUARIC HL, and product name: AQUARIC GL (all available from Nippon Shokubai Co., Ltd.).

In the present disclosure, it is preferable to add, to the ink, the color material in a state of being stably dispersed in the aqueous medium by the acrylic resin previously.

Examples of a method for the dispersing include methods [1] to [3] described below.

[1] A method of mixing the acrylic resin, the color material, which is a material to be dispersed, and the aqueous medium simultaneously.

[2] A method of adding and mixing the color material, which is a material to be dispersed, with a solution obtained by dissolving the acrylic resin in the aqueous medium while stirring the solution.

[3] A method of adding the acrylic resin to and mixing the acrylic resin with a mixture liquid obtained by adding and mixing the color material, which is a material to be dispersed, in the aqueous medium.

A mixing unit in the methods is not particularly limited and may be appropriately selected depending on the intended purpose. Examples of the mixing unit include known stirrers such as a homomixer, a homodisper, and a homogenizer.

The aqueous medium is not particularly limited and may be appropriately selected depending on the intended purpose. Examples of the aqueous medium include water, lower alcohols, and polyvalent alcohols.

The acrylic resin may be used in combination with any other resin than the acrylic resin.

The any other resin than the acrylic resin is not particularly limited and may be appropriately selected depending on the intended purpose. Examples of the any other resin include polyesters, phenol resins, polyamides, epoxy resins, and urea resins. One of these resins may be used alone or two or more of these resins may be used in combination.

A content of the acrylic resin is preferably 0.01 parts by mass or greater but 2 parts by mass or less and more preferably 0.05 parts by mass or greater but 1 part by mass or less relative to 100 parts by mass of the color material, which is a material to be dispersed.

<Urethane Resin Particles>

Examples of the urethane resin particles include polyether urethane resin particles, polyester urethane resin particles, and polycarbonate urethane resin particles. One kind of these urethane resin particles may be used alone or two or more kinds of these urethane resin particles may be used in combination. Among these kinds of urethane resin particles, polycarbonate urethane resin particles are preferable. The polycarbonate urethane resin particles refer to polycarbonate-based urethane resin particles containing polycarbonate in a structure.

The polycarbonate urethane resin particles can be obtained by making a polycarbonate polyol and a polyisocyanate undergo a reaction.

The polycarbonate polyol is not particularly limited and may be appropriately selected depending on the intended purpose. Examples of the polycarbonate polyol include: polycarbonate polyols obtained through an ester exchange reaction between carbonate ester and polyol in the presence of a catalyst; and polycarbonate polyols obtained through a reaction between phosgene and bisphenol A. One of these polycarbonate polyols may be used alone or two or more of these polycarbonate polyols may be used in combination.

Examples of the carbonate ester include methyl carbonate, dimethyl carbonate, ethyl carbonate, diethyl carbonate, cyclocarbonate, and diphenyl carbonate.

Examples of the polyol include low-molecular-weight diol compounds such as ethylene glycol, diethylene glycol, 1,2-propylene glycol, dipropylene glycol, 1,4-butanediol, 1,5-pentanediol, 3-methyl-1,5-pentanediol, neopentyl glycol, and 1,4-cyclohexanediol; polyethylene glycol; polypropylene glycol; and 1,6-hexanediol. One of these polyols may be used alone or two or more of these polyols may be used in combination.

The polyisocyanate is not particularly limited and may be appropriately selected depending on the intended purpose. Examples of the polyisocyanate include aromatic polyisocyanate compounds such as 1,3-phenylene diisocyanate, 1,4-phenylene diisocyanate, 2,4-tolylene diisocyanate (TDI), 2,6-tolylene diisocyanate, 4,4'-diphenylenemethane diisocyanate (MDI), 2,4-diphenylmethane diisocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, m-isocyanatophenylsulfonyl isocyanate, and p-isocyanatophenylsulfonyl isocyanate; aliphatic polyisocyanate compounds such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, and 2-isocyanatoethyl-2,6-diisocyanatohexanoate; and alicyclic polyisocyanate compounds such as isophorone diisocyanate (IPDI), 4,4'-dicyclohexylmethane diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5-norbornane diisocyanate, and 2,6-norbornane diisocyanate. One of these polyisocyanates may be used alone or two or more of these polyisocyanates may be used in combination. The ink of the present disclosure is used also for outdoor use such as a poster or a signage, so that the ink needs to form a coating film having an extremely high weather resistance over a long period of time. From the viewpoint of weather resistance over a long period of time, aliphatic polyisocyanate compounds and alicyclic diisocyanates are preferable among these polyisocyanates. From a viewpoint of strength of the coating film, at least one alicyclic diisocyanate is more preferable, and isophorone diisocyanate and dicyclohexylmethane diisocyanate are particularly preferable.

A content of the alicyclic diisocyanate is preferably 60% by mass or greater of a total amount of polyisocyanates.

It is preferable that the urethane resin particles be added in the form of resin emulsion in which the urethane resin particles are dispersed into an aqueous medium.

A resin solid concentration in the urethane resin particles is preferably 20% by mass or greater of a total amount of the resin emulsion. When the resin solid concentration is 20% by mass or greater, formulation designing is easy in formation into an ink.

A volume average particle diameter of the urethane resin particles is preferably 10 nm or greater but 350 nm or less in terms of storage stability in formation into an ink and intermittent discharging stability. The volume average particle diameter can be measured with, for example, a particle size distribution measuring instrument (instrument name: MICROTRAC UPA available from Nikkiso Co., Ltd.).

As a method for dispersing the urethane resin particles in the aqueous medium, it is possible to use forced-emulsifying urethane resin particles obtained by a forced emulsification method utilizing a dispersant. However, so-called self-emulsifying urethane resin particles containing anionic groups in a molecular structure are preferable because no dispersant remains in the coating film, and strength of the coating film can thus be improved.

An acid value of the self-emulsifying urethane resin particles containing anionic groups is preferably 20 mgKOH/g or greater but 100 mgKOH/g or less.

The anionic groups are not particularly limited and may be appropriately selected depending on the intended purpose. Examples of the anionic groups include a carboxyl group, a carboxylate group, a sulfonic group, and a sulfonate group. Among these anionic groups, a carboxylate group and a sulfonate group partially or totally neutralized with, for example, a basic compound are preferable from the viewpoint of maintaining water-dispersion stability.

Examples of the basic compound which can be used for neutralizing the anionic group include organic amines such as ammonia, triethyl amine, pyridine, and morpholine; alkanol amines such as monoethanolamine; and metallic base compounds containing, for example, Na, K, Li, or Ca.

When the forced emulsification method is used, it is preferable to use, for example, a surfactant.

The surfactant is not particularly limited and may be appropriately selected depending on the intended purpose. Examples of the surfactant include nonionic surfactants and anionic surfactants. One of these surfactants may be used alone or two or more of these surfactants may be used in combination. Among these surfactants, nonionic surfactants are preferable in terms of water resistance.

Examples of the nonionic surfactants include polyoxyethylene alkyl ethers, polyoxyethylene alkylene alkyl ethers, polyoxyethylene derivatives, polyoxyethylene fatty acid esters, polyoxyethylene polyvalent alcohol fatty acid esters, polyoxyethylene propylene polyols, sorbitan fatty acid esters, polyoxyethylene hydrogenated castor oils, polyoxyalkylene polycyclic phenyl ethers, polyoxyethylene sorbitan fatty acid esters, polyoxyethylene alkylamines, alkylalkanolamides, and polyalkylene glycol (meth)acrylates. One of these nonionic surfactants may be used alone or two or more of these nonionic surfactants may be used in combination. Among these nonionic surfactants, preferable are polyoxyethylene alkylethers, polyoxyethylene fatty acid esters, polyoxyethylene sorbitan fatty acid esters, and polyoxyethylene alkylamines.

Examples of the anionic surfactants include alkyl sulfuric acid ester salts, polyoxyethylene alkylether sulfates, alkyl benzene sulfonates, α-olefin sulfonates, methyl taurate, sulfosuccinate, ether sulfonates, ether carboxylates, fatty acid salts, naphthalene sulfonate formalin condensate, alkyl amine salts, quaternary ammonium salts, alkyl betaines, and alkyl amine oxides. One of these anionic surfactants may be used alone or two or more of these anionic surfactants may be used in combination. Among these anionic surfactants, polyoxyethylene alkylether sulfates and sulfosuccinate are preferable.

A content of the surfactant is preferably 0.1% by mass or greater but 30% by mass or less and more preferably 5% by mass or greater but 20% by mass or less relative to a total amount of the urethane resin particles. When the content is 0.1% by mass or greater but 30% by mass or less, an emulsifier is not likely to be produced in an excessive amount that is more than needed to form the urethane resin particles. This makes is possible to improve adherability and water resistance, and to suppress plasticization or bleeding upon drying of a coating film to prevent occurrence of blocking.

A method for producing the urethane resin particles is not particularly limited, and the urethane resin particles can be produced by a producing method hitherto commonly used. Examples of the method include a producing method described below.

First, in the absence of a solvent or in the presence of an organic solvent, the polycarbonate polyol is allowed to react with the polyisocyanate in an equivalent ratio so that isocyanate groups are excessively present, to produce an isocyanate-terminated urethane prepolymer.

Then, anionic groups in the isocyanate-terminated urethane prepolymer are optionally neutralized with the neutralizing agent and allowed to react with a chain extender, and, finally, the organic solvent in the system is optionally removed, to obtain the urethane resin particles.

Examples of the organic solvent include ketones such as acetone and methyl ethyl ketone; ethers such as tetrahydrofuran and dioxane; acetic acid esters such as ethyl acetate and butyl acetate; nitriles such as acetonitrile; and amides such as dimethyl formamide, N-methylpyrrolidone, and N-ethylpyrrolidone. One of these organic solvents may be used alone or two or more of these organic solvents may be used in combination.

Examples of the chain extender include polyamines or other active hydrogen atom-containing compounds. One of these chain extenders may be used alone or two or more of these chain extenders may be used in combination.

Examples of the polyamines include diamines such as ethylene diamine, 1,2-propane diamine, 1,6-hexamethylenediamine, piperazine, 2,5-dimethyl piperazine, isophoronediamine, 4,4'-dicyclohexylmethane diamine, and 1,4-cyclohexane diamine; polyamines such as diethylenetriamine, dipropylene triamine, and triethylene tetramine; hydrazines such as hydrazine, N,N'-dimethyl hydrazine, 1,6-hexamethylene bishydrazine; and dihydrazides such as succinic dihydrazide, adipic dihydrazide, glutaric dihydrazide, sebacic dihydrazide, and isophthalic dihydrazide. One of these polyamines may be used alone or two or more of these polyamines may be used in combination.

Examples of the other active hydrogen atom-containing compounds include: glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; phenols such as bisphenol A, 4,4'-dihydroxy diphenyl, 4,4'-dihydroxydiphenyl ether, 4,4'-dihydroxydiphenyl sulfone, hydrogenated bisphenol A, and hydroquinone; and water. One of these active hydrogen atom-containing compounds may be used alone or two or more of these active hydrogen atom-containing compounds may be used in combination, so long as the ink is not deteriorated in storage stability.

<<Resin Particles Other than Urethane Resin Particles>>

Resin particles other than the urethane resin particles are not particularly limited and may be appropriately selected depending on the intended purpose. Examples of such resin particles include polyester resin particles, acrylic-based resin particles, vinyl acetate-based resin particles, styrene-based resin particles, butadiene-based resin particles, styrene-butadiene-based resin particles, vinyl chloride-based resin particles, acrylic styrene-based resin particles, and acrylic silicone-based resin particles. One kind of these resin particles may be used alone or two or more kinds of these resin particles may be used in combination.

The resin particles other than the urethane resin particles may be an appropriately synthesized product or a commercially available product.

Examples of the commercially available product include product name: MICROGEL E-1002 and product name: E-5002 (styrene-acrylic-based resin particles, both available from Nippon Paint Co., Ltd.), product name: BONCOAT 4001 (acrylic-based resin particles available from DIC Corporation), product name: BONCOAT 5454 (styrene-acrylic-based resin particles available from DIC Corporation), product name: SAE-1014 (styrene-acrylic-based resin particles available from Zeon Corporation), product name: SAIVINOL SK-200 (acrylic-based resin particles available from Saiden Chemical Industry Co., Ltd.), product name: PRIMAL AC-22 and product name: AC-61 (acrylic-based resin particles available from Rohm and Haas Company), product name: NANOCRYL SBCX-2821 and product name: NANOCRYL SBCX-3689 (acrylic-silicone-based resin particles available from Toyo Ink Co., Ltd.), and product name: #3070 (methyl methacrylate polymer resin particles available from Mikuni Color Ltd.). One of these commercially available products may be used alone or two or more of these commercially available products may be used in combination.

A content of the resin particles other than the urethane resin particles is preferably 50% by mass or less of the total amount of the ink. When the content is 50% by mass or less, glossiness and scratch resistance can be improved.

<Organic Solvent>

As the organic solvent, the ink contains 3-methyl-3-methoxy-1-butanol and further contains any other organic solvent as needed.

A content of 3-methyl-3-methoxy-1-butanol is preferably 3% by mass or greater but 15% by mass or less of the total amount of the ink. When the content is 3% by mass or greater, glossiness can be improved. When the content is 15% by mass or less, the urethane resin particles can be prevented from being excessively swelled, and discharging reliability can be improved.

<<Any Other Organic Solvent>>

Examples of the any other organic solvent include: polyvalent alcohols such as ethylene glycol (a boiling point: 197.3° C.), diethylene glycol (a boiling point: 244.3° C.), 3-methoxy-1-butanol (a boiling point: 158° C.), 1,2-propanediol (a boiling point: 188.2° C.), 1,3-propanediol (a boiling point: 214° C.), 1,2-butanediol (a boiling point: 198° C.), 1,3-butanediol (a boiling point: 207.5° C.), 2,3-butanediol (a boiling point: 77° C.), 3-methyl-1,3-butanediol (a boiling point: 116° C.), triethylene glycol (a boiling point: 278.4° C.), polyethylene glycol, polypropylene glycol, 1,5-pentanediol (a boiling point: 239° C.), 1,6-hexanediol (a boiling point: 250° C.), glycerin (a boiling point: 290° C.), 1,2,6-hexanetriol (a boiling point: 178° C.), 2-ethyl-1,3-hexanediol (a boiling point: 244° C.), 1,2,4-butanetriol (a boiling point: 325° C.), 1,2,3-butanetriol (a boiling point: 175° C.), and 3-methylpentane-1,3,5-triol (petriol, a boiling point: 216° C.); polyvalent alcohol alkylethers such as ethylene glycol monoethylether (a boiling point: 196° C.), ethylene glycol monobutylether (a boiling point: 171° C.), diethylene glycol monomethylether (a boiling point: 194° C.), diethylene glycol monoethylether (a boiling point: 202° C.), diethylene glycol monobutylether (a boiling point: 194° C.), tetraethylene glycol monomethylether (a boiling point: 275° C.), and propylene glycol monoethylether (a boiling point: 132.8° C.); polyvalent alcohol arylethers such as ethylene glycol monophenylether (a boiling point: 237° C.) and ethylene glycol monobenzylether (a boiling point: 158° C.); nitrogen-containing heterocyclic compounds such as 2-pyrrolidone (a boiling point: 245° C.), N-methyl-2-pyrrolidone (a boiling point: 204° C.), N-hydroxyethyl-2-pyrrolidone (a boiling point: 309° C.), 1,3-dimethylimidazolidinone (a boiling point: 220° C.), ε-caprolactam (a boiling point: in a range of from 136° C. through 138° C.), and γ-butyrolactone (a boiling point: 204° C.); amides such as formamide (a boiling point: 210° C.), N-methylformamide (a boiling point: 199° C.), and N,N-dimethylformamide (a boiling point: 153° C.); amines such as monoethanolamine (a boiling point: 170° C.), diethanolamine (a boiling point: 280° C.), and triethylamine (a boiling point: 89.7° C.); sulfur-containing compounds such as dimethylsulfoxide (a boiling point: 189° C.), sulfolane (a boiling point: 285° C.), and thiodiethanol (a boiling point: in a range of from 164° C. through 166° C.); propylene carbonate (a boiling point: 242.1° C.); and ethylene carbonate (a boiling point: 260.7° C.). One of these organic solvents may be used alone or two or more of these organic solvents may be used in combination. Among these organic solvents, 1,2-propanediol, 1,2-butanediol, and 2,3-butanediol are preferable.

A boiling point of the organic solvent when considered together with all organic solvents contained in the ink is preferably 150° C. or higher but 270° C. or lower and more preferably 170° C. or higher but 250° C. or lower. When the boiling point is 150° C. or higher but 270° C. or lower, a high intermittent discharging stability is obtained, and driability of a formed image is favorable. In terms of promoting a vaporizing speed, a content of any organic solvent having a boiling point of higher than 250° C. is preferably lower than 10% by mass of a total amount of organic solvents, and it is more preferable not to add an organic solvent having a boiling point of higher than 250° C.

A content of the organic solvent is preferably 20% by mass or greater but 70% by mass or less and more preferably 30% by mass or greater but 60% by mass or less of the total amount of the ink. When the content is 20% by mass or greater, the ink hardly dries and intermittent discharging stability can be sufficiently improved. When the content is 70% by mass or less, a viscosity can be suppressed to a low level and intermittent discharging stability can be improved.

<Water>

The water is not particularly limited and may be appropriately selected depending on the intended purpose. Examples of the water include: pure water such as ion-exchanged water, ultrafiltrated water, reverse osmotic water, and distilled water; and ultrapure water. One of these kinds of water may be used alone or two or more of these kinds of water may be used in combination.

A content of the water is preferably 15% by mass or greater but 60% by mass or less and more preferably 20% by mass or greater but 40% by mass or less of the total amount of the ink. When the content is 15% by mass or greater, the ink can be prevented from being high in viscosity, and intermittent discharging stability can be improved. When the content is 60% by mass or less, a favorable wettability into a recording medium can be obtained and image qualities can be improved.

<Other Components>

Examples of the other components include surfactants, antiseptic antifungal agents, anti-rust agents, and pH adjusters.

<<Surfactant>>

It is preferable that the ink of the present disclosure contain a surfactant in terms of wettability into a recording medium.

The surfactant is not particularly limited and may be appropriately selected depending on the intended purpose. Examples of the surfactant include anionic surfactants, nonionic surfactants, ampholytic surfactants, fluorosurfactants, and silicone surfactants. One of these surfactants may be used alone or two or more of these surfactants may be used in combination. Among these surfactants, nonionic surfactants are preferable in terms of dispersion stability of the color material and image qualities.

Examples of the anionic surfactants include polyoxyethylene alkylether acetates, dodecylbenzene sulfonates, sucnic acid ester sulfonate, lauric acid salts, and salts of polyoxyethylene alkylether sulfates. One of these anionic surfactants may be used alone or two or more of these anionic surfactants may be used in combination.

Examples of the nonionic surfactants include acetylene glycol-based surfactants, polyoxyethylene alkylethers, polyoxyethylene alkylphenylethers, polyoxyethylene alkyl esters, sorbitan fatty acid esters, polyoxyethylene sorbitan fatty acid esters, polyoxyethylene alkylamines, polyoxyethylene alkylamides, polyoxyethylene propylene block polymers, and acetylene alcohol-ethylene oxide adducts. One of these nonionic surfactants may be used alone or two or more of these nonionic surfactants may be used in combination.

Examples of the acetylene glycol-based surfactants include 2,4,7,9-tetramethyl-5-desine-4,7-diol, 3,6-dimethyl-4-octyne-3,6-diol, and 3,5-dimethyl-1-hexyn-3-ol. One of these acetylene glycol-based surfactants may be used alone or two or more of these acetylene glycol-based surfactants may be used in combination. The acetylene glycol-based surfactant may be a commercially available product. Examples of the commercially available product include SURFYNOL SERIES (104, 82, 465, 485, and TG) available from Air Products & Chemicals Inc. One of these commercially available products may be used alone or two or more of these commercially available products may be used in combination.

Examples of the ampholytic surfactants include laurylamino propionate, lauryldimethyl betaine, stearyldimethyl betaine, lauryldihydroxyethyl betaine, lauryldimethylamine oxide, myristyldimethylamine oxide, stearyldimethylamine oxide, dihydroethyl laurylamine oxide, polyoxyethylene palm oil alkyldimethylamine oxides, dimethylalkyl (palm) betaines, and dimethyllauryl betaine. One of these ampholytic surfactants may be used alone or two or more of these ampholytic surfactants may be used in combination.

The ampholytic surfactants may be commercially available products. Examples of the commercially available products include products available from Nikko Chemicals Co., Ltd., Nihon Emulsion Co., Ltd., Nippon Shokubai Co., Ltd., Toho Chemical Industry Co., Ltd., Kao Corporation, ADEKA Corporation, Lion Corporation, Aoki Oil Industrial Co., Ltd., and Sanyo Chemical Industries, Ltd. One of these commercially available products may be used alone or two or more of these commercially available products may be used in combination.

A content of the surfactant is preferably 0.1% by mass or greater but 5% by mass or less of the total amount of the ink. When the content is 0.1% by mass or greater, wettability into an impermeable base material and image qualities can be improved. When the content is 5% by mass or less, the ink is less likely to foam, and discharging stability can be improved.

<<Antiseptic-Antifungal Agent>>

The antiseptic-antifungal agent is not particularly limited and may be appropriately selected depending on the intended purpose. Examples of the antiseptic-antifungal agent include 1,2-benzisothiazolin-3-one, sodium benzoate, sodium dehydroacetate, sodium sorbate, sodium pentachlorophenol, and sodium 2-pyridinethiol-1-oxide. One of these antiseptic-antifungal agents may be used alone or two or more of these antiseptic-antifungal agents may be used in combination.

<<Anti-Rust Agent>>

The anti-rust agent is not particularly limited and may be appropriately selected depending on the intended purpose. Examples of the anti-rust agent include acidic sulfite, sodium thiosulfate, ammonium thiodiglycolate, diisopropyl ammonium nitrite, pentaerythritol tetranitrate, and dicyclohexyl ammonium nitrite. One of these anti-rust agents may be used alone or two or more of these anti-rust agents may be used in combination.

<<pH Adjuster>>

The pH adjuster is not particularly limited and may be appropriately selected depending on the intended purpose so long as the pH adjuster can adjust pH of the ink to a desired value without adversely affecting the ink. Examples of the pH adjuster include hydroxides of alkali metal elements (e.g., lithium hydroxide, sodium hydroxide, and potassium hydroxide), carbonates of alkali metals (e.g., lithium carbonate, sodium carbonate, and potassium carbonate), quaternary ammonium hydroxide, amines (e.g., diethanolamine and triethanolamine), ammonium hydroxide, and quaternary phosphonium hydroxide. One of these pH adjusters may be used alone or two or more of these pH adjusters may be used in combination.

[Viscosity]

A viscosity of the ink of the present disclosure is preferably 2 mPa·s or higher and more preferably 3 mPa·s or higher but 20 mPa·s or lower at 25° C. in terms of intermittent discharging stability and image qualities such as qualities of characters when recorded over plain paper. When the viscosity is 2 mPa·s or higher, intermittent discharging stability can be improved.

[Producing Method]

A method for producing the ink of the present disclosure is not particularly limited and may be appropriately selected depending on the intended purpose. Examples of the method include a method including: producing a color material dispersion in which a color material is dispersed with an acrylic resin; then dispersing or dissolving water, the color material dispersion, urethane resin particles, 3-methyl-3-methoxy-1-butanol, and other components in an aqueous medium; and as needed, stirring and mixing the materials.

For the stirring and mixing, for example, a stirrer using a typical stirring blade, a magnetic stirrer, or a high-speed disperser may be used.

(Ink Cartridge)

An ink cartridge of the present disclosure includes the ink of the present disclosure and a container storing the ink, and further includes other members appropriately selected as needed.

The container is not particularly limited and may be of any shape, any structure, any size, and any material that may be appropriately selected depending on the intended purpose. Examples of the container include a container including at least an ink bag made of, for example, an aluminium laminate film or a resin film.

(Inkjet Recording Method and Inkjet Recording Apparatus)

An inkjet recording method of the present disclosure includes at least an ink flying step, preferably includes a heating step, and further includes other steps as needed.

An inkjet recording apparatus of the present disclosure includes at least an ink flying unit, preferably includes a heating unit, and further includes other units as needed.

The inkjet recording method of the present disclosure can be favorably performed by the inkjet recording apparatus of the present disclosure. The ink flying step can be favorably performed by the ink flying unit. The other steps can be favorably performed by the other units.

—Ink Flying Step and Ink Flying Unit—

The ink flying step is a step of applying a stimulus (energy) to an ink used in an ink set of the present disclosure to fly the ink from various types of ink discharging nozzles and record an image over a recording medium.

The ink flying unit is a unit configured to apply a stimulus (energy) to the ink of the present disclosure to fly the ink from various types of ink discharging nozzles to deliver the ink onto a recording medium.

The stimulus is not particularly limited and may be appropriately selected depending on the intended purpose. Examples of the stimulus include heat (temperature), pressure, vibration, and light. One of these stimuli may be used alone or two or more of these stimuli may be used in combination. Among these stimuli, heat and pressure are preferable.

Examples of an ink flying method used for the ink include: a so-called piezo method (see, e.g., Japanese Examined Patent Publication No. 02-51734) using a piezoelectric element as a pressure generating unit to pressurize the ink in an ink flow path to deform a vibration plate constituting a wall surface of the ink flow path and change the internal capacity of the ink flow path to discharge ink droplets; a so-called thermal method (see, e.g., Japanese Examined Patent Publication No. 61-59911) using a heating element to heat an ink in an ink flow path and generate bubbles; and an electrostatic method (see, e.g., Japanese Unexamined Patent Application Publication No. 06-71882) using a vibration plate constituting a wall surface of an ink flow path and an electrode disposed counter to the vibration plate to deform the vibration plate by the effect of an electrostatic force generated between the vibration plate and the electrode and change the internal capacity of the ink flow path to discharge ink droplets.

A size of liquid droplets of the ink to be flown is preferably 3 pL or greater but 40 pL or less. A discharging/jetting speed of the liquid droplets of the ink is preferably 5 m/s or higher but 20 m/s or lower. A driving frequency for flying the liquid droplets of the ink is preferably 1 kHz or higher. A resolution of the liquid droplets of the ink is preferably 300 dpi or higher.

—Heating Step and Heating Unit—

The heating step is a step of heating the recording medium over which an image is recorded.

The heating unit is a unit configured to heat the recording medium over which an image is recorded.

The inkjet recording method and the inkjet recording apparatus are capable of applying a high-quality image recording over the recording medium. However, in order to be capable of forming an image with higher image qualities, a higher scratch resistance, and a higher close adhesiveness and of responding to high-speed recording conditions, it is preferable that the inkjet recording method and the inkjet recording apparatus heat the recording medium after recording. The heating step, if provided after recording, promotes film formation of the resin contained in the ink. This can improve an image hardness of a recorded matter.

Many known devices may be used as a device used in the heating step. Examples of the device include devices for, for example, forced-air heating, radiation heating, conduction heating, high-frequency drying, and microwave drying. One of these devices may be used alone or two or more of these devices may be used in combination.

A temperature for the heating and a time for the heating may be varied depending on the kind and amount of a water-soluble organic solvent contained in the ink and the minimum filming temperature of the resin emulsion to be added, and may also be varied depending on the kind of a base material to be printed.

The temperature for the heating is preferably high, more preferably 40° C. or higher but 120° C. or lower, and particularly preferably 50° C. or higher but 90° C. or lower in terms of driability and a filming temperature. When the temperature for the heating is 40° C. or higher but 120° C. or lower, it is possible to prevent an impermeable base material to be printed from being damaged by heat and to suppress no occurrence of discharging due to warming of an ink head.

The time for the heating is preferably 1 minute or longer but 3 hours or shorter and more preferably 3 minutes or longer but 1 hour or shorter.

The ink of the present disclosure is not limited to an inkjet recording method, but may be used for wide purposes. Examples of the purposes other than the inkjet recording method include a blade coating method, a gravure coating method, a gravure offset coating method, a bar coating method, a roll coating method, a knife coating method, an air knife coating method, a comma coating method, a U-comma coating method, an AKKU coating method, a smoothing coating method, a microgravure coating method, a reverse roll coating method, a 4- or 5-roll coating method, a dip coating method, a curtain coating method, a slide coating method, a die coating method, and a spray coating method.

Figure 2:
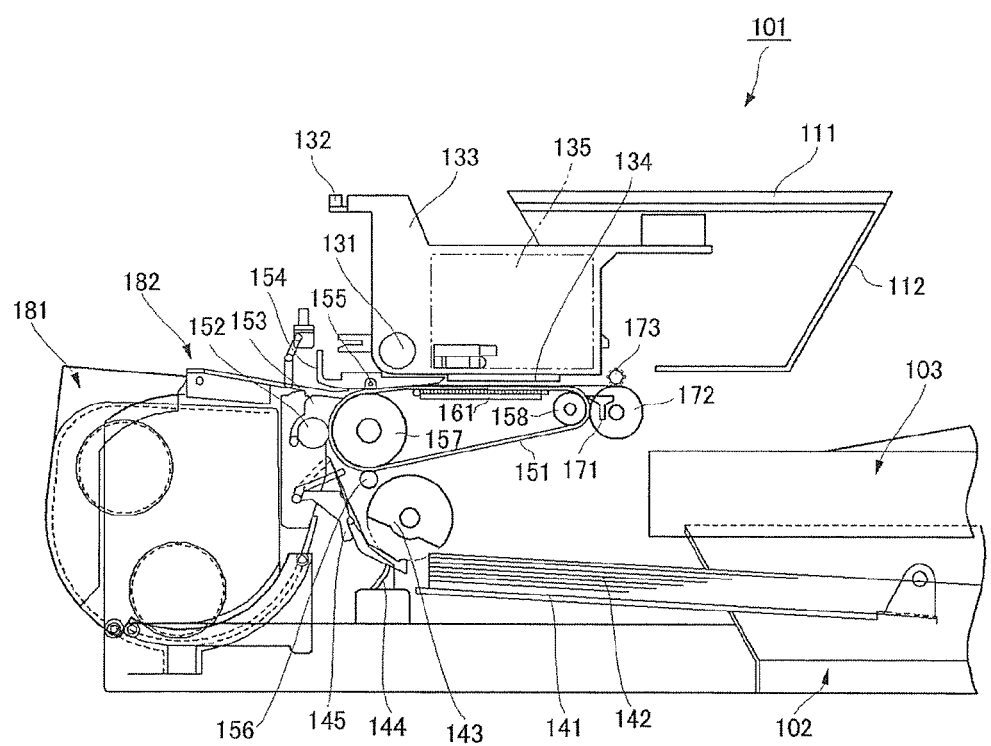
FIG. 2 is a schematic view illustrating an example of a configuration inside a main body of the apparatus of FIG. 1.

An inkjet recording apparatus which can perform recording using the ink of the present disclosure will be described with reference to drawings. The inkjet recording apparatus includes a serial type (shuttle type) inkjet recording apparatus in which a carriage is used for scanning, and a line type inkjet recording apparatus which contains a line type head. FIG. 1 is a schematic view illustrating one example of a serial type inkjet recording apparatus. FIG. 2 is a schematic view illustrating a configuration in a main body of the apparatus of FIG. 1.

As illustrated in FIG. 1, the inkjet recording apparatus contains an apparatus main body 101, a paper feeding tray 102 provided in the apparatus main body 101, a paper ejecting tray 103, and an ink cartridge loading section 104. On an upper surface of the ink cartridge loading section 104, a control section 105 such as operation keys and a display is provided. The ink cartridge loading section 104 has a front cover 115 that can be opened and closed for attaching or detaching an ink cartridge 201. Reference numeral 111 denotes a head cover, and reference numeral 112 denotes a front surface of the front cover.

In the apparatus main body 101, as illustrated in FIG. 2, a carriage 133 is slidably held in a main-scanning direction by a guide rod 131, which is a guide member laterally bridged between left and right side plates (unillustrated), and a stay 132, and is moved for scanning by a main scanning motor (unillustrated).

A recording head 134 including four inkjet recording heads configured to discharge ink droplets of yellow (Y), cyan (C), magenta (M), and black (Bk) is installed in the carriage 133 such that a plurality of ink discharging outlets are aligned in the direction intersecting the main scanning direction and such that the ink droplet discharging direction faces downward.

For each of the inkjet recording heads constituting the recording head 134, it is possible to use, for example, a head provided with any of the following units as a unit configured to generate energy for discharging ink: a piezoelectric actuator such as a piezoelectric element, a thermal actuator that uses a thermoelectric transducer such as a heating element and utilizes phase change caused by film boiling of a liquid, a shape memory alloy actuator that utilizes a metal phase change caused by a temperature change, and an electrostatic actuator that utilizes electrostatic force.

Also, the carriage 133 is provided with sub-tanks 135 for each color configured to supply each color ink to the recording head 134. Each sub-tank 135 is supplied and replenished with the ink from the ink cartridge 201 loaded into the ink cartridge loading section 104, via an ink supply tube (unillustrated).

Meanwhile, as a paper feeding section configured to feed a base material 142 loaded on a base material loading section (pressure plate) 141 of the paper feeding tray 102, there are provided a half-moon roller (paper feeding roller 143) configured to feed the base material 142 one by one from the base material loading section 141, and a separation pad 144 which faces the paper feeding roller 143 and is formed of a material with a large friction coefficient. This separation pad 144 is biased toward the paper feeding roller 143 side.

As a conveyance section configured to convey the base material 142, which has been fed from this paper feeding section, under the recording head 134, there are provided: a conveyance belt 151 for conveying the base material 142 by means of electrostatic attraction; a counter roller 152 for conveying the base material 142, which is sent from the paper feeding section via a guide 145, while the base material is sandwiched between the counter roller and the conveyance belt 151; a conveyance guide 153 for making the base material 142, which is sent upward in the approximately vertical direction, change directions by approximately 90° and thus run along the conveyance belt 151; and an end pressurizing roller 155 biased toward the conveyance belt 151 side by a pressing member 154. Also, there is provided a charging roller 156 serving as a charging unit configured to charge a surface of the conveyance belt 151.

The conveyance belt 151 is an endless belt, and is capable of rotating in a belt conveyance direction by stretching between a heater type conveyance roller 157 and a tension roller 158. The conveyance belt 151 has, for example, a surface layer which serves as a surface for attracting a base material, and a back layer (intermediate resistance layer, ground layer). The surface layer is formed of a resinous material having a thickness of about 40 μm; e.g., ethylenetetrafluoroethylene copolymer (ETFE), and has not undergone resistance control. The back layer is formed of the same material as the surface layer, and has undergone resistance control using carbon. On the back of the conveyance belt 151, a heater type guide member 161 is placed correspondingly to a region where printing is performed by the recording head 134. Additionally, as a paper ejecting section configured to eject the base material 142 on which images have been recorded by the recording head 134, there are provided a separation claw 171 for separating the base material 142 from the conveyance belt 151, a paper ejecting roller 172, and a paper ejecting roller 173. The base material 142 is subjected to hot-air drying by means of a fan heater (unillustrated), followed by being output to the paper ejecting tray 103 placed below the paper ejecting roller 172.

A double-sided paper feeding unit 181 is detachably mounted on a rear surface portion of the apparatus main body 101. The double-sided paper feeding unit 181 takes in the base material 142 returned by rotation of the conveyance belt 151 in the opposite direction, reverses the base material 142, and then refeeds the base material 142 between the counter roller 152 and the conveyance belt 151. Additionally, a manual paper feeding section 182 is provided on an upper surface of the double-sided paper feeding unit 181.

In the inkjet recording apparatus, the base material 142 is fed one by one from the paper feeding section, and the base material 142 fed upward in the approximately vertical direction is guided by the guide 145 and conveyed with being sandwiched between the conveyance belt 151 and the counter roller 152. Further, an end of the base material is guided by the conveyance guide 153 and pressed onto the conveyance belt 151 by the end pressurizing roller 155, so that the conveyance direction of the base material is changed by approximately 90°. On this occasion, the conveyance belt 151 is charged by the charging roller 156, and the base material 142 is electrostatically attracted onto the conveyance belt 151 and thusly conveyed.

Here, by driving the recording head 134 according to an image signal while moving the carriage 133, ink droplets are discharged onto the base material 142 having stopped so as to perform recording for one line. Then, the base material 142 is conveyed by a predetermined distance, and then recording for the next line is performed. On receipt of a recording completion signal or a signal indicating that a rear end of the base material 142 has reached a recording region, recording operation is finished, and the base material 142 is ejected onto the paper ejecting tray 103.

(Recorded Matter)

A recorded matter of the present disclosure includes a recording medium and an image recorded over the recording medium with the ink.

The recording medium is not particularly limited, and for example, plain paper, gloss paper, special paper, and cloth may be used. The ink of the present disclosure can provide an image having a favorable chromogenic property even when applied over an impermeable base material.

The impermeable base material refers to a base material having a surface low in at least one of water permeability, absorbability, and adsorptivity. The impermeable base material encompasses also a material including many voids inside but unopened to the outside. More quantitatively, the impermeable base material refers to a base material that results in a water absorption amount, measured by the Bristow method, of 10 mL/m$^2$ or less when 30 msec$^{1/2}$ has passed from a start of contact.

For example, plastic films such as vinyl chloride resin films, PET films, and polycarbonate films are preferable as the impermeable base material. However, the ink exhibits sufficient properties over other impermeable base materials and hitherto used permeable media such as plain paper and inorganic material-coated permeable media.

EXAMPLES

The present disclosure will be specifically described below by way of Examples. However, the present disclosure should not be construed as being limited to the Examples.

Dispersant-Polymer Synthesis Example 1

<Synthesis of Dispersant Polymer A>

A hundred and fifty parts by mass of water was put in a four-necked flask equipped with a thermometer, a stirrer, and a reflux condenser, and was heated to 80° C. Next, a mixture of 50 parts by mass of water, 80 parts by mass of acrylic acid, 10 parts by mass of methacrylic acid, 20 parts by mass of ethylhexyl methacrylate, and 1 part by mass of hydroxypropyl (meth)acrylate, and 10 parts by mass of a 30% by mass sodium persulfate aqueous solution were each added dropwise for 3 hours under stirring, to make the materials undergo polymerization reaction at 80° C. After completion of the dropwise addition, the system was retained at 80° C. further for 1 hour to complete the polymerization reaction. After this, 120 parts by mass of a 32% by mass sodium hydroxide aqueous solution was added dropwise to completely neutralize the reaction liquid, to obtain a dispersant polymer A containing acrylic resin.

Dispersant-Polymer Synthesis Example 2

<Synthesis of Dispersant Polymer B>

A dispersant polymer B containing acrylic resin was obtained in the same manner as in Dispersant-polymer synthesis example 1, except that the ethylhexyl methacrylate and the hydroxypropyl (meth)acrylate used in Dispersant-polymer synthesis example 1 were changed to butyl acrylate and N-methylolacrylamide, respectively.

Color-Material-Dispersion Preparation Example 1

<Preparation of Black Pigment Dispersion A>

Two parts by mass of the dispersant polymer A and 78 parts by mass of water were stirred with a disperser (apparatus name: TK HOMOMIXER available from Primix Corporation), to obtain a uniform dispersant aqueous solution. Twenty parts by mass of carbon black (product name: MONARCH 800 available from Cabot Corporation) was added to the dispersant aqueous solution and subjected to dispersion by stirring at a rotation speed of 4,000 rpm for 15 minutes, to obtain a black pigment dispersion A (pigment solid concentration: 20% by mass).

Color-Material-Dispersion Preparation Example 2

<Preparation of Black Pigment Dispersion B>

A black pigment dispersion B (pigment solid concentration: 20% by mass) was obtained in the same manner as in Color-material-dispersion preparation example 1, except that the dispersant polymer A used in Color-material-dispersion preparation example 1 was changed to an acrylic resin (product name: ARON T-50 available from Toagosei Co., Ltd.).

Color-Material-Dispersion Preparation Example 3

<Preparation of Black Pigment Dispersion C>

A black pigment dispersion C (pigment solid concentration: 20% by mass) was obtained in the same manner as in Color-material-dispersion preparation example 1, except that the dispersant polymer A used in Color-material-dispersion preparation example 1 was changed to an acrylic resin (product name: AQUARIC DL available from Nippon Shokubai Co., Ltd.).

Color-Material-Dispersion Preparation Example 4

<Preparation of Black Pigment Dispersion D>

Twenty parts by mass of carbon black (product name: MONARCH 800 available from Cabot Corporation), 4 parts by mass of an anionic surfactant (product name: PIONIN A-51-B available from Takemoto Oil & Fat Co., Ltd.), and 76 parts by mass of ion-exchanged water were mixed. After this, the resultant was subjected to circulation dispersion with a disk-type bead mill (KDL TYPE available from Shinmaru Enterprises Corporation, media: zirconia balls having a diameter of 0.3 mm) for 7 hours, to obtain a black pigment dispersion D (pigment solid concentration: 20% by mass). The black pigment dispersion D was a surfactant-dispersed pigment dispersion.

Color-Material-Dispersion Preparation Example 5

<Preparation of Black Pigment Dispersion E>

A 1 L flask equipped with a mechanical stirrer, a thermometer, a nitrogen-gas introducing tube, a reflux condenser, and a dropping funnel was sufficiently purged with a nitrogen gas. Then, 11.2 parts by mass of styrene, 2.8 parts by mass of acrylic acid, 12.0 parts by mass of lauryl methacrylate, 4.0 parts by mass of polyethylene glycol methacrylate, 4.0 parts by mass of a styrene macromer (product name: AS-6 available from Toagosei Co., Ltd.), and 0.4 parts by mass of mercaptoethanol were mixed and heated to 65° C. in the flask. Then, a mixed solution of 100.8 parts by mass of styrene, 25.2 parts by mass of acrylic resin, 108.0 parts by mass of lauryl methacrylate, 36.0 parts by mass of polyethylene glycol methacrylate, 60.0 parts by mass of hydroxyethyl methacrylate, 36.0 parts by mass of a styrene macromer (product name: AS-6 available from Toagosei Co., Ltd.), 3.6 parts by mass of mercaptoethanol, 2.4 parts by mass of azobismethylvaleronitrile, and 18 parts by mass of methyl ethyl ketone was added dropwise into the flask in 2.5 hours. After the dropping, a mixed solution of 0.8 parts by mass of azobismethylvaleronitrile and 18 parts by mass of methyl ethyl ketone was added dropwise into the flask in 0.5 hours. After the flask was maintained at 65° C. for 1 hour, 0.8 parts by mass of azobismethylvaleronitrile was added, and the flask was maintained in this state for 1 hour. After completion of the reaction, 364 parts by mass of methyl ethyl ketone was added into the flask, to obtain 800 parts by mass of a polymer solution having a concentration of 50% by mass.

Twenty eight parts by mass of the polymer solution, 42 parts by mass of carbon black (product name: FW100 available from Degussa AG), 13.6 parts by mass of a 1 mol/L potassium hydroxide aqueous solution, 20 parts by mass of methyl ethyl ketone, and 13.6 parts by mass of ion-exchanged water were stirred sufficiently and then kneaded with a roll mill. The obtained paste was fed to 200 parts by mass of pure water and sufficiently stirred. Then, methyl ethyl ketone and water were evaporated from the resultant with an evaporator. In order to remove coarse particles, the obtained dispersion liquid was subjected to pressure filtration through a polyvinylidene fluoride membrane filter having an average pore diameter of 5.0 μm, to obtain a black pigment dispersion E (pigment solid concentration: 15% by mass). The black pigment dispersion E was a resin-coated pigment dispersion having a resin solid concentration of 20% by mass.

Color-Material-Dispersion Preparation Example 6

<Preparation of Cyan Pigment Dispersion>

A cyan pigment dispersion (pigment solid concentration: 20% by mass) was obtained in the same manner as in Color-material-dispersion preparation example 1, except that the carbon black used in Color-material-dispersion preparation example 1 was changed to Pigment Blue 15:4

(product name: SMART CYAN 3154BA available from Sensient Technologies Corporation).

Color-Material-Dispersion Preparation Example 7

<Preparation of Magenta Pigment Dispersion>
A magenta pigment dispersion (pigment solid concentration: 20% by mass) was obtained in the same manner as in Color-material-dispersion preparation example 1, except that the carbon black and the dispersant polymer A used in Color-material-dispersion preparation example 1 were changed to Pigment Red 122 (product name: PIGMENT RED 122 available from Sun Chemical Corporation) and the dispersant polymer B, respectively.

Color-Material-Dispersion Preparation Example 8

<Preparation of Yellow Pigment Dispersion>
A yellow pigment dispersion (pigment solid concentration: 20% by mass) was obtained in the same manner as in Color-material-dispersion preparation example 1, except that the carbon black and the dispersant polymer A used in Color-material-dispersion preparation example 1 were changed to Pigment Yellow 74 (product name: SMART YELLOW 3074BA available from Sensient Technologies Corporation) and the dispersant polymer B, respectively.

Urethane-Resin-Particle Synthesis Example 1

<Synthesis of Polycarbonate Urethane Resin Particles A>
A reaction vessel equipped with a stirrer, a reflux condenser, and a thermometer was charged with 1,500 parts by mass of polycarbonate diol (reaction product of 1,6-hexanediol and dimethyl carbonate), 220 parts by mass of 2,2-dimethylol propionic acid (hereinafter may be referred to as "DMPA"), and 1,347 parts by mass of N-methylpyrrolidone (hereinafter may be referred to as "NMP") under a nitrogen gas stream, followed by heating to 60° C. to dissolve DMPA. Then, 1,445 parts by mass of 4,4'-dicyclohexylmethane diisocyanate and 2.6 parts by mass of dibutyl tin dilaurate (catalyst) were added to the resultant, followed by heating to 90° C. The resultant was allowed to undergo urethanization reaction for 5 hours, to obtain an isocyanate-terminated urethane prepolymer. The resultant reaction mixture was cooled to 80° C. Then, 149 parts by mass of triethylamine was added to and mixed with the resultant, and 4,340 parts by mass out of the resultant mixture was taken out and added to a mixed solution of 5,400 parts by mass of water and 15 parts by mass of triethylamine under vigorous stirring. Then, 1,500 parts by mass of ice and 626 parts by mass of a 35% by mass solution of 2-methyl-1,5-pentanediamine in water were added to the resultant, which was allowed to undergo a chain elongation reaction. The solvent was evaporated so as to give a solid concentration of 30% by mass, to obtain polycarbonate urethane resin particles A (volume average particle diameter: 20 nm). The volume average particle diameter was measured with a particle size distribution measuring instrument (instrument name: MICROTRAC UPA available from Nikkiso Co., Ltd.).

Urethane-Resin-Particle Synthesis Example 2

<Synthesis of Polycarbonate Urethane Resin Particles B>
Polycarbonate urethane resin particles B (solid concentration: 30% by mass, volume average particle diameter: 120 nm) were obtained in the same manner as in Urethane-resin-particle synthesis example 1, except that 4,4'-dicyclohexyl-methane diisocyanate used in Urethane-resin-particle synthesis example 1 was changed to 1,6-hexane diisocyanate. The volume average particle diameter was measured with a particle size distribution measuring instrument (instrument name: MICROTRAC UPA available from Nikkiso Co., Ltd.).

Urethane-Resin-Particle Synthesis Example 3

<Synthesis of Polyether Urethane Resin Particles>
Polyether urethane resin particles (solid concentration: 30% by mass, volume average particle diameter: 82 nm) were obtained in the same manner as in Urethane-resin-particle synthesis example 1, except that polycarbonate diol used in Urethane-resin-particle synthesis example 1 was changed to polyether polyol (product name: HIFLEX D2000 available from DKS Co. Ltd.). The volume average particle diameter was measured with a particle size distribution measuring instrument (instrument name: MICROTRAC UPA available from Nikkiso Co., Ltd.).

Urethane-Resin-Particle Synthesis Example 4

<Synthesis of Polyester Urethane Resin Particles>
Polyester urethane resin particles (solid concentration: 30% by mass, volume average particle diameter: 47 nm) were obtained in the same manner as in Urethane-resin-particle synthesis example 1, except that polycarbonate diol used in Urethane-resin-particle synthesis example 1 was changed to polyester polyol (product name: POLYLITE OD-X-2420 available from DIC Corporation). The volume average particle diameter was measured with a particle size distribution measuring instrument (instrument name: MICROTRAC UPA available from Nikkiso Co., Ltd.).

Acrylic Resin Particle Synthesis Example

<Synthesis of Acrylic Resin Particles>
Nine hundred parts by mass of ion-exchanged water and 1 part by mass of sodium lauryl sulfate were put in a reaction vessel equipped with a stirrer, a reflux condenser, a dropping device, and a thermometer and heated to 70° C. under stirring and nitrogen purging. With the internal temperature retained at 70° C., 4 parts by mass of potassium persulfate, serving as a polymerization initiator, was added to and dissolved in the resultant. An emulsion previously obtained by adding together 450 parts by mass of ion-exchanged water, 3 parts by mass of sodium lauryl sulfate, 20 parts by mass of acrylamide, 365 parts by mass of styrene, 545 parts by mass of butyl acrylate, and 10 parts by mass of methacrylic acid under stirring, was continuously added dropwise into the reaction solution in 4 hour. After completion of the dropwise addition, the resultant was retained for 3 hours. The obtained aqueous emulsion was cooled to normal temperature, and ion-exchanged water and a sodium hydroxide aqueous solution were added to the resultant to adjust pH to 8, to obtain acrylic resin particles (solid concentration: 30% by mass).

Example 1

Twenty percent by mass of the black pigment dispersion A, 15% by mass of the polycarbonate urethane resin particles A, 5% by mass of 3-methyl-3-methoxy-1-butanol (available from Kuraray Co., Ltd.), a nonionic surfactant (product name: SOFTANOL EP-5035 available from Nippon Shokubai Co., Ltd.), 20% by mass of 1,2-propanediol (available from ADEKA Corporation), 0.1% by mass of an antiseptic-antifungal agent (product name: PROXEL LV available from Avecia Corporation Limited), and water (balance) were mixed and stirred, and filtrated through a polypropylene filter having an average pore diameter of 0.2 µm (available from Pall Corporation Japan), to produce an ink 1. The composition is presented in Table 1.

Examples 2 to 11 and Comparative Examples 1 to 6

Inks 2 to 17 were produced in the same manner as in Example 1, except that the composition and contents of Example 1 were changed to the composition and contents presented in Table 1 to Table 3.

The produced inks 1 to 17 of Examples 1 to 11 and Comparative Examples 1 to 6 were evaluated in terms of "intermittent discharging stability", "scratch resistance", and "glossiness" in the manners described below. The results are presented in Table 1 to Table 3.

<Intermittent Discharging Stability>

An inkjet printer (apparatus name: IPSIO GXE5500 available from Ricoh Co., Ltd.) was loaded with the inks 1 to 17 of Examples 1 to 11 and Comparative Examples 1 to 6, and subjected to head cleaning under conditions where a temperature was 25° C. and a humidity was 15% RH. After the head cleaning, the inkjet printer was left to stand under the conditions where a temperature was 25° C. and a humidity was 15% RH for 1 hour with the head capping removed. Then, a nozzle check pattern was printed to evaluate "intermittent discharging stability" according to the evaluation criteria described below. In the evaluation, B or higher is a tolerable level.

[Evaluation Criteria]

A: There were no nozzles where discharging did not occur and jetting disorder was observed.

B: There were no nozzles where discharging did not occur, but there were nozzles where slight jetting disorder was observed.

C: There were nozzles where discharging did not occur.

<Scratch Resistance>

With an inkjet printer (apparatus name: IPSIO GXE5500 available from Ricoh Co., Ltd.) that was loaded with the inks 1 to 17 of Examples 1 to 11 and Comparative Examples 1 to 6, a solid image having a size of 3 cm×3 cm was recorded over a white vinyl chloride sheet (PVC, product name: IJ5331 available from 3M Japan Limited) in a manner that the ink would be attached in an amount of 5 g/m$^2$, and then dried with a drier (device name: OF-300B available from AS ONE Corporation) at 80° C. for 1 hour. The obtained solid image was scratched with dry cotton (calico No. 3) under a load of 400 g, to visually observe the conditions of the image and evaluate "scratch resistance" according to the evaluation criteria described below. In the evaluation, B or higher is a tolerable level.

[Evaluation Criteria]

A: The image had not changed through more than or equal to 51 times of scratching.

B: The image had not changed through more than or equal to 41 times but less than or equal to 50 times of scratching.

C: The image had not changed through more than or equal to 31 times but less than or equal to 40 times of scratching.

D: The image had not changed through less than or equal to 30 times of scratching.

<Glossiness>

With an inkjet printer (apparatus name: IPSIO GXE5500 available from Ricoh Co., Ltd.) that was loaded with the inks 1 to 17 of Examples 1 to 11 and Comparative Examples 1 to 6, a solid image having a size of 3 cm×3 cm was recorded over a white vinyl chloride sheet (PVC, product name: IJ5331 available from 3M Japan Limited) in a manner that the ink would be attached in an amount of 5 g/m$^2$, and then dried with a drier (device name: OF-300B available from AS ONE Corporation) at 80° C. for 1 hour. A degree of glossiness of the obtained solid image at 60° was measured with a gloss meter (instrument name: 4501 available from BYK Gardner GmbH) to evaluate "glossiness". A degree of glossiness at 60° of 50 or higher is a tolerable level.

TABLE 1

|  |  | Examples |  |  |  |  |  |
|---|---|---|---|---|---|---|---|
|  |  | 1 | 2 | 3 | 4 | 5 | 6 |
| Color material dispersion | Black pigment dispersion A | 20 | — | — | — | 20 | 20 |
|  | Black pigment dispersion B | — | — | — | — | — | — |
|  | Black pigment dispersion C | — | — | — | — | — | — |
|  | Black pigment dispersion D | — | — | — | — | — | — |
|  | Black pigment dispersion E | — | — | — | — | — | — |
|  | Cyan pigment dispersion | — | 20 | — | — | — | — |
|  | Magenta pigment dispersion | — | — | 20 | — | — | — |
|  | Yellow pigment dispersion | — | — | — | 20 | — | — |
| Urethane resin particles | Polycarbonate urethane resin particles A (volume average particle diameter: 20 nm) | 15 | — | — | — | — | — |
|  | Polycarbonate urethane resin particles B (volume average particle diameter: 120 nm) | — | 15 | — | — | — | — |
|  | Polycarbonate urethane resin particles C (volume average particle diameter: 125 um) | — | — | 15 | — | — | — |
|  | Polycarbonate urethane resin particles D (volume average particle diameter: 11 nm) | — | — | — | 15 | — | — |
|  | Polyester urethane resin particles (volume average particle diameter: 47 nm) | — | — | — | — | 15 | — |
|  | Polyether urethane resin particles (volume average particle diameter: 82 nm) | — | — | — | — | — | 15 |
|  | Acrylic resin particles | — | — | — | — | — | — |

TABLE 1-continued

|  |  | Examples | | | | | |
| --- | --- | --- | --- | --- | --- | --- | --- |
|  |  | 1 | 2 | 3 | 4 | 5 | 6 |
| Organic solvent | 3-methyl-3-methoxy-1-butanol | 5 | 7 | 15 | 3 | 5 | 5 |
| Other organic solvents | 1,2-propanediol (boiling point: 188.2° C.) | 20 | — | — | 10 | 20 | 20 |
|  | 1,2-butanediol (boiling point: 198° C.) | — | 20 | — | 5 | — | — |
|  | 2,3-butanediol (boiling point: 77° C.) | — | — | 20 | 5 | — | — |
|  | Diethylene glycol monobutylether (boiling point: 194° C.) | — | — | — | — | — | — |
|  | 3-methoxy-1-butanol (boiling point: 158° C.) | — | — | — | — | — | — |
|  | Nonionic surfactant | 2 | 2 | 2 | 2 | 2 | 2 |
| Antiseptic antifungal agent | PROXEL LV | 0.1 | 0.1 | 0.1 | 0.1 | 0.1 | 0.1 |
|  | Ion-exchanged water | Balance | Balance | Balance | Balance | Balance | Balance |
|  | Total (% by mass) | 100 | 100 | 100 | 100 | 100 | 100 |
| Evaluation result | Intermittent discharging stability | A | A | A | A | A | B |
|  | Scratch resistance | A | A | A | A | B | B |
|  | Glossiness | 110 | 90 | 87 | 102 | 52 | 78 |

TABLE 2

|  |  | Examples | | | | |
| --- | --- | --- | --- | --- | --- | --- |
|  |  | 7 | 8 | 9 | 10 | 11 |
| Color material dispersion | Black pigment dispersion A | — | — | 20 | 20 | 20 |
|  | Black pigment dispersion B | 20 | — | — | — | — |
|  | Black pigment dispersion C | — | 20 | — | — | — |
|  | Black pigment dispersion D | — | — | — | — | — |
|  | Black pigment dispersion E | — | — | — | — | — |
|  | Cyan pigment dispersion | — | — | — | — | — |
|  | Magenta pigment dispersion | — | — | — | — | — |
|  | Yellow pigment dispersion | — | — | — | — | — |
| Urethane resin particles | Polycarbonate urethane resin particles A (volume average particle diameter: 20 nm) | 15 | 15 | 15 | 15 | 15 |
|  | Polycarbonate urethane resin particles B (volume average particle diameter: 120 nm) | — | — | — | — | — |
|  | Polycarbonate urethane resin particles C (volume average particle diameter: 125 nm) | — | — | — | — | — |
|  | Polycarbonate urethane resin particles D (volume average particle diameter: 11 nm) | — | — | — | — | — |
|  | Polyester urethane resin particles (volume average particle diameter: 47 nm) | — | — | — | — | — |
|  | Polyether urethane resin particles (volume average particle diameter: 82 nm) | — | — | — | — | — |
|  | Acrylic resin particles | — | — | — | — | — |
| Organic solvent | 3-methyl-3-methoxy-1-butanol | 5 | 5 | 1 | 2.5 | 16 |
| Other organic solvents | 1,2-propanediol (boiling point: 188.2° C.) | 20 | 20 | 20 | 20 | 20 |
|  | 1,2-butanediol (boiling point: 198° C.) | — | — | — | — | — |
|  | 2,3-butanediol (boiling point: 77° C.) | — | — | — | — | — |
|  | Diethylene glycol monobutylether (boiling point: 194° C.) | — | — | — | — | — |
|  | 3-methoxy-1-butanol (boiling point: 158° C.) | — | — | — | — | — |
|  | Nonionic surfactant | 2 | 2 | 2 | 2 | 2 |
| Antiseptic antifungal agent | PROXEL LV | 0.1 | 0.1 | 0.1 | 0.1 | 0.1 |
|  | Ion-exchanged water | Balance | Balance | Balance | Balance | Balance |
|  | Total (% by mass) | 100 | 100 | 100 | 100 | 100 |
| Evaluation result | Intermittent discharging stability | A | A | A | A | A |
|  | Scratch resistance | A | A | A | A | B |
|  | Glossiness | 125 | 108 | 62 | 75 | 100 |

TABLE 3

|  |  | Comparative Examples | | | | | |
| --- | --- | --- | --- | --- | --- | --- | --- |
|  |  | 1 | 2 | 3 | 4 | 5 | 6 |
| Color material dispersion | Black pigment dispersion A | 20 | — | — | — | 20 | 20 |
|  | Black pigment dispersion B | — | — | — | — | — | — |
|  | Black pigment dispersion C | — | — | — | — | — | — |
|  | Black pigment dispersion D | — | — | 20 | — | — | — |
|  | Black pigment dispersion E | — | — | — | 20 | — | — |
|  | Cyan pigment dispersion | — | — | — | — | — | — |
|  | Magenta pigment dispersion | — | 20 | — | — | — | — |
|  | Yellow pigment dispersion | — | — | — | — | — | — |
| Urethane resin particles | Polycarbonate urethane resin particles A (volume average particle diameter: 20 nm) | 15 | — | 15 | 15 | — | — |
|  | Polycarbonate urethane resin particles B (volume average particle diameter: 120 nm) | — | — | — | — | — | — |
|  | Polycarbonate urethane resin particles C (volume average particle diameter: 125 nm) | — | 15 | — | — | — | — |
|  | Polycarbonate urethane resin particles D (volume average particle diameter: 11 nm) | — | — | — | — | — | — |
|  | Polyester urethane resin particles (volume average particle diameter: 47 nm) | — | — | — | — | — | — |
|  | Polyether urethane resin particles (volume average particle diameter: 82 nm) | — | — | — | — | — | — |
|  | Acrylic resin particles | — | — | — | — | 15 | — |
| Organic solvent | 3-methyl-3-methoxy-1-butanol | — | — | 5 | 5 | 5 | 5 |
| Other organic solvents | 1,2-propanediol (boiling point: 188.2° C.) | 20 | — | 20 | 20 | 20 | 20 |
|  | 1,2-butanediol (boiling point: 198° C.) | — | — | — | — | — | — |
|  | 2,3-butanediol (boiling point: 77° C.) | — | 20 | — | — | — | — |
|  | Diethylene glycol monobutylether (boiling point: 194° C.) | 5 | — | — | — | — | — |
|  | 3-methoxy-1-butanol (boiling point: 158° C.) | — | 5 | — | — | — | — |
|  | Nonionic surfactant | 2 | 2 | 2 | 2 | 2 | 2 |
| Antiseptic-antifungal agent | PROXEL LV | 0.1 | 0.1 | 0.1 | 0.1 | 0.1 | 0.1 |
|  | Ion-exchanged water | Balance | Balance | Balance | Balance | Balance | Balance |
|  | Total (% by mass) | 100 | 100 | 100 | 100 | 100 | 100 |
| Evaluation result | Intermittent discharging stability | A | A | C | C | B | A |
|  | Scratch resistance | A | A | B | B | C | D |
|  | Glossiness | 20 | 14 | 55 | 81 | 91 | 4 |

Product names and supplier names of the components presented in Table 1 to Table 3 are as follows.

Polycarbonate urethane resin particles C: available from Sanyo Chemical Industries, Ltd., product name: UCOAT UX-485, solid concentration: 40% by mass, volume average particle diameter 125 nm Polycarbonate urethane resin particles D: available from DKS Co., Ltd., product name: SUPERFLEX 420, solid concentration: 32% by mass, volume average particle diameter: 11 nm 1,2-Butanediol: available from Shinko Organic Chemical Industry Ltd.

2,3-Butanediol: BASF GmbH

Diethylene glycol monobutylether: available from KH Neochem Co., Ltd.

3-Methoxy-1-butanol: available from Daicel Corporation

It was revealed that the inks 1 to 11 of Examples 1 to 11 had scratch resistance and glossiness that were in no way inferior to these properties of solvent-based inks. Furthermore, from the evaluation results, it was revealed that the ink of the present disclosure was suitable for outdoor use.

<Evaluation of Influence of Heating Treatment on Image After Recording>

In Test 1, "scratch resistance" and "glossiness" were evaluated in the same manner as in the evaluation of the "scratch resistance" and the "glossiness" using the ink 1 of Example 1, except that conditions for drying a solid image after recording were changed from 80° C. for 1 hour used in the evaluation of Example 1 to 25° C. for overnight. The results are presented in Table 4.

TABLE 4

|  | Example 1 | Test 1 |
| --- | --- | --- |
| Drying conditions | 80° C., 1 hour | 25° C., overnight |
| Scratch resistance | A | B |
| Glossiness | 110 | 100 |

Aspects of the present disclosure are as follows, for example.

<1> An ink including:
water;
a color material;
an acrylic resin;
urethane resin particles; and
at least one organic solvent,
wherein the at least one organic solvent includes 3-methyl-3-methoxy-1-butanol.
<2> The ink according to <1>,
wherein the urethane resin particles are polycarbonate urethane resin particles.
<3> The ink according to <1> or <2>,
wherein a content of the 3-methyl-3-methoxy-1-butanol is 3% by mass or greater but 15% by mass or less.
<4> The ink according to any one of <1> to <3>,
wherein a volume average particle diameter of the urethane resin particles is 10 nm or greater but 350 nm or less.

<5> The ink according to any one of <1> to <4>, wherein the color material includes a pigment.
<6> The ink according to any one of <1> to <5>, wherein a content of the color material is 0.1% by mass or greater but 10% by mass or less.
<7> The ink according to any one of <1> to <6>, wherein a content of the acrylic resin is 0.01 parts by mass or greater but 2 parts by mass or less relative to 100 parts by mass of the color material.
<8> The ink according to any one of <1> to <7>, further including a nonionic surfactant.
<9> The ink according to any one of <1> to <8>, further including one or more organic solvents selected from the group consisting of 1,2-propanediol, 1,2-butanediol, and 2,3-butanediol.
<10> The ink according to any one of <1> to <9>, wherein a content of the at least one organic solvent is 20% by mass or greater but 70% by mass or less.
<11> The ink according to any one of <1> to <10>, wherein a boiling point of the at least one organic solvent is 150° C. or higher but 270° C. or lower.
<12> The ink according to any one of <1> to <11>, wherein a content of an organic solvent having a boiling point of higher than 250° C. is less than 10% by mass of a total amount of the at least one organic solvent.
<13> The ink according to any one of <1> to <12>, wherein the color material is dispersed by a dispersant polymer containing the acrylic resin.
<14> The ink according to <13>, wherein a weight average molecular weight of the dispersant polymer is 3,000 or greater but 50,000 or less.
<15> The ink according to any one of <1> to <14>, wherein the urethane resin particles are self-emulsifying urethane resin particles.
<16> An ink cartridge including:
the ink according to any one of <1> to <15>; and
a container storing the ink.
<17> An inkjet recording apparatus including
an ink delivering unit configured to apply a stimulus to the ink according to any one of <1> to <15> to deliver the ink onto a recording medium.
<18> An inkjet recording method including
an ink flying step of applying a stimulus to the ink according to any one of <1> to <15> to fly the ink and record an image over a recording medium.
<19> The inkjet recording method according to <18>, further including
after the ink flying step,
a heating step of heating the recording medium.
<20> A recorded matter including
an image recorded with the ink according to any one of <1> to <15>.

The ink according to any one of <1> to <15>, the inkjet recording apparatus according to <17>, and the inkjet recording method according to <18> or <19> aim to solve the various problems of the related art described above and achieve an object described below. That is, the ink, the inkjet recording apparatus, and the inkjet recording method have an object to provide an ink, an inkjet recording apparatus, and an inkjet recording method that are excellent in intermittent discharging stability and are capable of providing an image having a favorable scratch resistance and a favorable glossiness.

The ink cartridge according to <16> aims to solve the various problems of the related art described above and achieve an object described below. That is, the ink cartridge has an object to provide an ink cartridge storing an ink that is excellent in intermittent discharging stability and is capable of providing an image having a favorable scratch resistance and a favorable glossiness.

The recorded matter according to <20> aims to solve the various problems of the related art described above and achieve an object described below. That is, the recorded matter has an object to provide a recorded matter obtained by being recorded with an ink that is excellent in intermittent discharging stability and is capable of providing an image having a favorable scratch resistance and a favorable glossiness.

What is claimed is:

1. An ink comprising:
water;
a color material;
an acrylic resin;
urethane resin particles; and
at least one organic solvent comprising 3-methyl-3-methoxy-1-butanol, wherein
another organic solvent amongst the plural organic solvents comprises 1,2-propanediol, and
a content of the acrylic resin is 0.01 parts by mass or greater but 2 parts by mass or less relative to 100 parts by mass of the color material.

2. The ink according to claim 1, wherein the urethane resin particles comprise polycarbonate urethane resin particles.

3. The ink according to claim 1, wherein a content of the 3-methyl-3-methoxy-1-butanol is 3% by mass or greater but 15% by mass or less.

4. The ink according to claim 1, wherein a volume average particle diameter of the urethane resin particles is 10 nm or greater but 350 nm or less.

5. The ink according to claim 1, wherein the color material comprises a pigment.

6. The ink according to claim 1, wherein a content of the color material is 0.1% by mass or greater but 10% by mass or less.

7. The ink according to claim 1, further comprising a nonionic surfactant.

8. The ink according to claim 1, wherein a content of the at least one organic solvent is 20% by mass or greater but 70% by mass or less.

9. The ink according to claim 1, wherein a boiling point of the at least one organic solvent is 150° C. or higher but 270° C. or lower.

10. The ink according to claim 1, wherein a content of an organic solvent having a boiling point of higher than 250° C. is less than 10% by mass of a total amount of the at least one organic solvent.

11. The ink according to claim 1, wherein the color material is dispersed by a dispersant polymer that comprises the acrylic resin.

12. The ink according to claim 1, wherein the urethane resin particles comprise self-emulsifying urethane resin particles.

13. An ink cartridge comprising:
the ink according to claim 1; and
a container storing the ink.

14. A recorded matter comprising
an image recorded with the ink according to claim 1.

15. The ink according to claim 11, wherein a weight average molecular weight of the dispersant polymer is 3,000 or greater but 50,000 or less.

16. An inkjet recording apparatus comprising
an ink delivering unit configured to apply a stimulus to an ink to deliver the ink onto a recording medium, wherein the ink comprises:
  water;
  a color material;
  an acrylic resin;
  urethane resin particles; and
  plural organic solvents,
wherein at least one of the plural organic solvents comprises 3-methyl-3-methoxy-1-butanol,
wherein another organic solvent amongst the plural organic solvents comprises 1,2-propanediol, and
wherein a content of the acrylic resin is 0.01 parts by mass or greater but 2 parts by mass or less relative to 100 parts by mass of the color material.

17. An inkjet recording method comprising
applying a stimulus to an ink to fly the ink and record an image over a recording medium,
wherein the ink comprises:
  water;
  a color material;
  an acrylic resin;
  urethane resin particles; and
  plural organic solvents,
wherein at least one of the plural organic solvents comprises 3-methyl-3-methoxy-1-butanol, and
wherein another organic solvent amongst the plural organic solvents comprises 1,2-propanediol, and
wherein a content of the acrylic resin is 0.01 parts by mass or greater but 2 parts by mass or less relative to 100 parts by mass of the color material.

18. The inkjet recording method according to claim 17, further comprising
after recording of the image over the recording medium, heating the recording medium.

* * * * *